United States Patent
Zimmerman et al.

(10) Patent No.: US 7,173,879 B2
(45) Date of Patent: Feb. 6, 2007

(54) HIGH RESOLUTION OBSTACLE AVOIDANCE AND BOTTOM MAPPING ARRAY PROCESSING TECHNIQUE

(75) Inventors: Matthew Jason Zimmerman, Providence, RI (US); James Henry Miller, Kingston, RI (US)

(73) Assignee: Farsounder, Inc., Providence, RI (US)

( * ) Notice: Subject to any disclaimer, the term of this patent is extended or adjusted under 35 U.S.C. 154(b) by 266 days.

(21) Appl. No.: 10/862,342

(22) Filed: Jun. 8, 2004

(65) Prior Publication Data

US 2005/0007881 A1  Jan. 13, 2005

Related U.S. Application Data

(60) Provisional application No. 60/476,836, filed on Jun. 9, 2003.

(51) Int. Cl.
*G01S 15/00* (2006.01)
(52) U.S. Cl. ...................................... 367/103
(58) Field of Classification Search ............... 367/103, 367/909
See application file for complete search history.

(56) References Cited

U.S. PATENT DOCUMENTS 5,359,333 A * 10/1994 Withers, Jr. ................. 342/195

* cited by examiner

*Primary Examiner*—Dan Pihulic
(74) *Attorney, Agent, or Firm*—Mark S. Leonardo, Esq.; Brown Rudnick Berlack Israels LLP

(57) ABSTRACT

A processing technique to apply high resolution, non-Fourier based beamformers to practical active sonar system implementations.

13 Claims, 8 Drawing Sheets

HIGH RESOLUTION OBSTACLE AVOIDANCE AND BOTTOM MAPPING ARRAY PROCESSING TECHNIQUE

PRIORITY

Priority is claimed to U.S. patent application Ser. No. 60/476,836, which was filed on Jun. 9th, 2003.

BACKGROUND

The performance of a 3-D forward-looking bottom mapping and obstacle detection sonar can be limited by the beamwidth of the receive sensor array. Most phase array technologies utilize a Fourier based beamformer to transfer the received signals from the individual channel domain to a direction angle domain.

A Fourier-based beamformer has a beamwidth in the x or y direction of approximately 50/M degrees where M is the size of the array in the x or y axis as measured in wavelengths. When these closely spaced signals (134) fall within a beamwidth of one another and near each other in time, a Fourier-based beamformer is unable to separate the two or more signals. Additionally, Fourier based beamformers create signal artifacts called sidelobes. Sidelobes generated by the beamformer mathematics are signal which appear to be targets with a small signal level coming from directions where there are no targets. These sidelobes can be falsely detected as actual targets.

An alternative to Fourier based beamformers is the model-based beamformer. A model-based beamformer exploits *a priori* knowledge of the signal such as the fact that it is a plane wave with a certain direction. In a two-dimensional problem with N sensors (hydrophones in the preferred embodiment), the Fourier based beamformer calculates the N or more power levels associated with each direction. In the model-based beamformer, the unknown directions can be the subject of a search or optimization. The phase or time relationship between each of the sensors is represented in the covariance matrix. This complex matrix is the expected value of the product of the sensor outputs. The phases of the off-diagonal terms contain the information about the direction of the signal. The preferred embodiment of the invention involves exploiting the covariance structure of the received signals on the array.

Non-Fourier based beamformers have been developed over the past few decades. These approaches offer the promise of higher resolutions for a given array aperture and reduced sidelobe levels. This capability offers the advantage of improved target separation and the detection of small targets at the same absolute range as larger targets without the false alarm rate of detecting the larger target's sidelobes as actual smaller targets. However, there techniques have been developed for passive systems. When applying them to active systems, there are two common limitations, with most non-Fourier based beamformers having one or more of these limitations.

One limitation is they require a statistically relevant number of samples from the same signal. These are often called "snapshots". In an active system, the signals created by the targets are generally of long or continuous duration such as the noise created "whirl" of a propeller or the "roar" of an engine. When applied to an active system, these solutions still require multiple snapshots. If the sonar system and all targets where completely stationary and the environment was static, multiple transmissions could be made on the same target "scene" with each transmission being a single snapshot. In the practical implementation of an active sonar system, this is generally not possible. For obstacle avoidance sonar systems, the either sonar system or the target, or both are moving and the scene is not stationary. Therefore, approaches demonstrated in the prior art by such non-Fourier based beamformers requiring multiple snapshots are not practical for forward-looking sonar systems.

The second limitation is that they require *a priori* information about the number of targets they should detect. Under most situations, this requirement is not practical. In unknown environments such as those encountered where active sonar systems are used, it is generally impossible to know how many targets are to be detected at a given range.

SUMMARY OF THE INVENTION

The invention defined in this application provides a solution to the common limitations of non-Fourier based beamformers for active sonar operation. Multiple snapshots are generated from a single transmission and are used to build a statistically significant set of snapshots for target localization. The invention also includes a procedure for determining the number of targets for which the non-Fourier based beamformer should search.

DETAILED DESCRIPTION OF THE INVENTION

The invention will be described in connection with certain preferred embodiments, with reference to the following illustrative figures so that it may be more fully understood. With reference to the figures, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
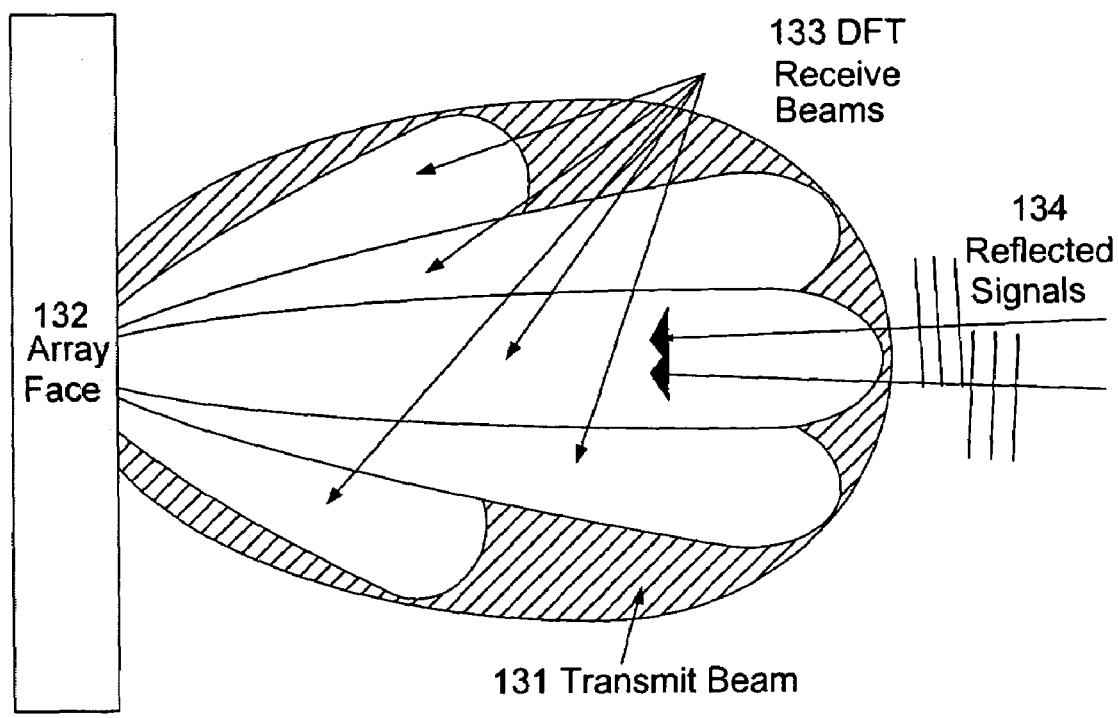
FIG. 1 is an illustration of an active sonar transmit/receive schema featuring a Broad Beam Transmitter with Narrow Beam Receiver.

FIG. 1 shows an illustration of an active sonar transmit/receive schema featuring a Broad Beam Transmitter with Narrow Beam Receiver. In the preferred embodiment, the invention consists of an active sonar system featuring broad beam transmitter, narrow beam receiver and a processor system designed to beamform acoustic data produced by the hardware using a non-Fourier based beamformer and optionally correlation based processing techniques to extract valid targets from the beamformed data set (often called target models) such as but not limited to those as described in U.S. patent application 60/474402.

The preferred embodiment has a transmit transducer which projects a signal into the water ahead of a vessel and utilizes a phased planar array of receiving sensors which provides electrical signals related to the acoustic signals to a computer which determines the azimuthal and elevation angles of arrival and time of arrival. The estimates of the azimuthal and elevation angles of the received signal are limited if the signal is composed of reflections from two or more closely spaced targets as shown in FIG. 1. Another embodiment described below allows for the use of the techniques described in this application to a curvilinear or conformal array.

The 2-dimensional angles of these incoming signals are estimated using the structure of a covariance matrix. In the preferred embodiment, eigenvectors of the signal covariance matrix can be estimated without calculation of the entire covariance matrix by singular value decomposition of the appropriately rotated signal matrix. The rotation involves a multiplication by a matrix which transforms the generally complex signal matrix into conjugate centro-symmetric matrix. In prior art by Zoltowski et al., a radar application is discussed in the light of the method.

Figure 2:
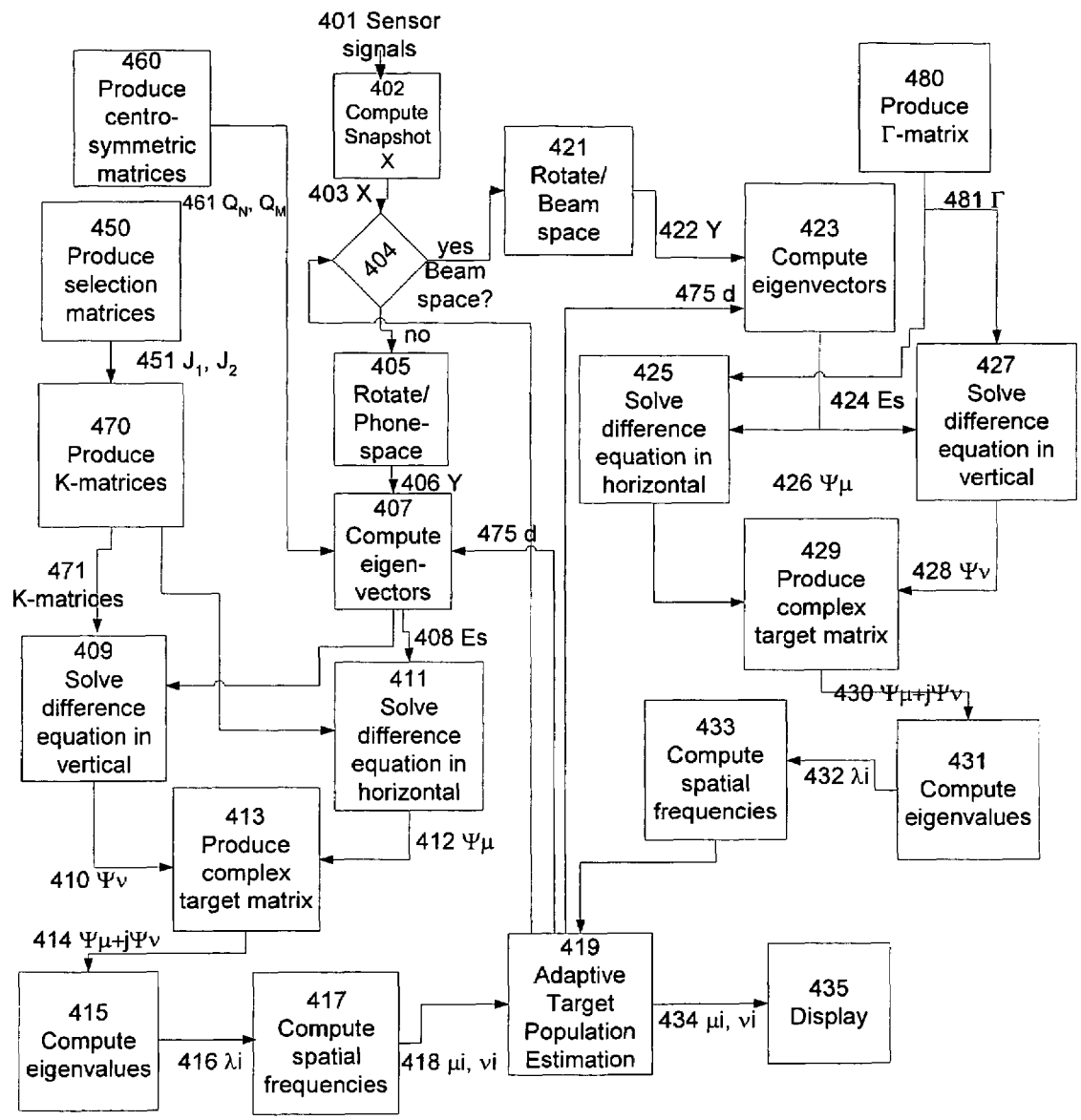
FIG. 2 is a block diagram of the non-Fourier based beamformer processing for active sonar using an ESPRIT processor.

In the preferred embodiment, a sonar obstacle avoidance and bottom mapping application is envisaged. Other model-based beamformers can be exploited such as Minimum Variance Distortionless Response (MVDR), Multiple Signal Classification (MUSIC), and Estimation of Signal Parameters via Rotationally Invariant Techniques (ESPRIT). The areas of improvement over the prior art described in this application are applicable to ESPRIT, MUSIC, MVDR, and other high resolution beamforming techniques. A block diagram of the preferred embodiment utilizing ESPRIT is shown in FIG. 2.

The method described in the application has two variations: phone space and beamspace. In the phone space version of the embodiment, the signal matrix includes snapshots over some period of time as long as the received pulse is coherent. The result of model-based beamformer is an estimate of the angles of arrival from some number of signals.

Figure 3:
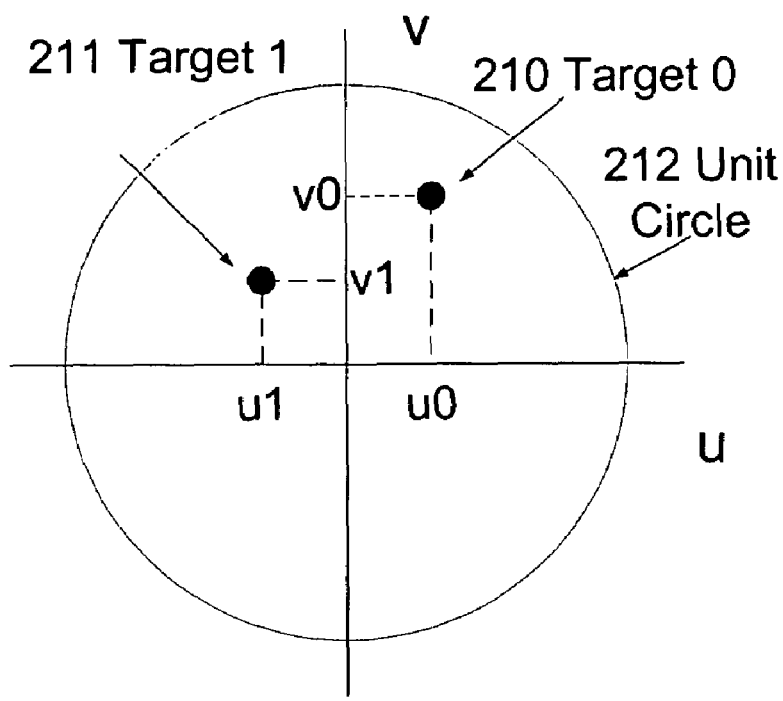
FIG. 3 is an illustration of two targets represented on a direction cosine plot.

In FIG. 3, the signals reflected off two or more targets are represented (210 and 211) on the (u,v) plane where u and v are the direction cosines in the x and y directions. The maximum value for square root of the sum of the squares of u and v is one and is represented by the unit circle (212).

Figure 4:
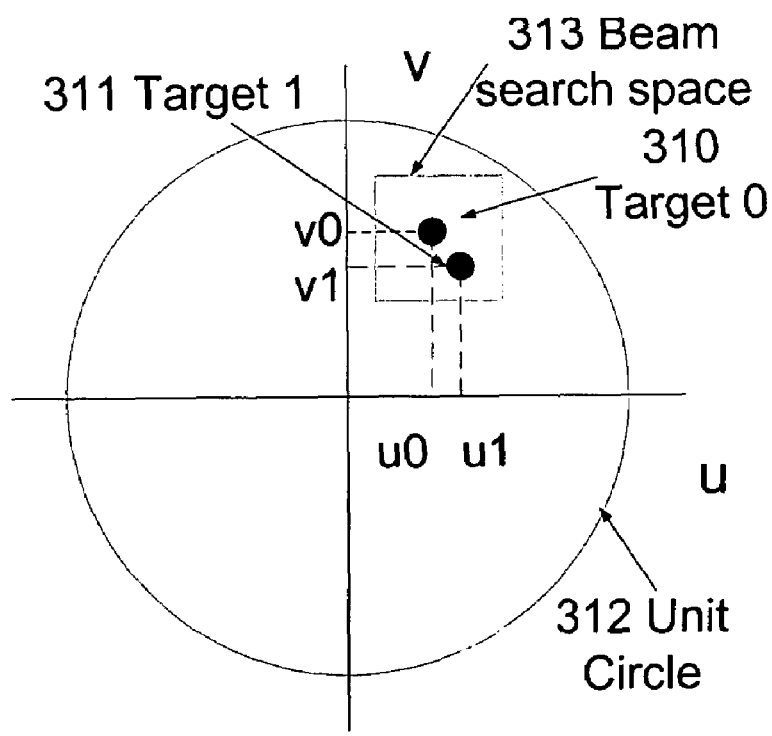
FIG. 4 is an illustration of two targets represented on a direction cosine plot with a priori information.

In the beamspace implementation of the preferred embodiment, the model based beamformer can utilize a priori that might be available from a Fourier based beamformer or other procedure. FIG. 4, shows the signals reflected off two or more targets are represented (310 and 311) on the (u,v) plane where u and v are the direction cosines in the x and y directions. The maximum value for square root of the sum of the squares of u and v is one and is represented by the unit circle (312). The a priori information is represented by smaller region over which to search for the direction cosines of target 0 (313).

In the preferred embodiment, sensor signals (401) are placed in a snapshot matrix X (403). The snapshot matrix is sized by the number of sensors by the number of snapshots. The bandpass sampling method described in prior art integrated into the model based beamforming described in this application. The complex envelope of the sampled signal on each sensor is stored in the snapshot matrix (403). Coherence between sensors in space and time provide the information necessary to calculate the direction of arrival for two or more closely spaced target reflected signals. The snapshot matrix calculation is one area of improvement over the prior art and involves stacking the output of the data acquisition system described in prior art. In the preferred embodiment, samples of the complex envelope of the received signals scattered from targets are stacked in X (403). The transmit signals could be from a pulsed CW transmit signal or in another embodiment, from other wideband signals such as but not limited to FM chirp signals with a time bandwidth product greater than one. The duration of the transmit signal and the sampling rate at the receiver provides an upper limit to the number of samples that can be stacked.

This combination of bandpass sampling and model-based beamforming is one area of improvement of prior art. It provides a significant reduction in data throughput while allowing the performance achievable by fullband sampling when combined with model-based beamforming. The reduction in throughput allows for practical implementation of the model-based beamforming algorithms on affordable processors.

Figure 5:
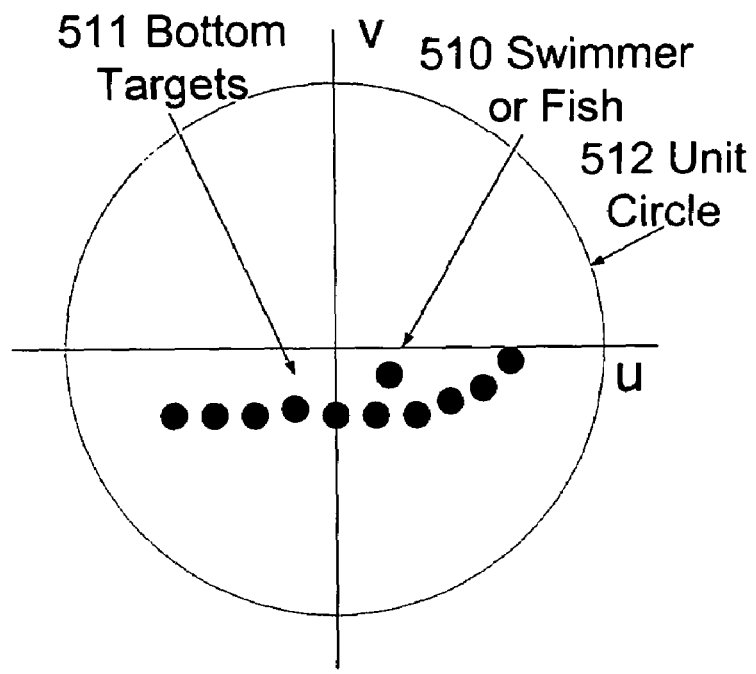
FIG. 5 is an illustration of an isolated target near a set of targets from the seafloor represented on a direction cosine plot.

The snapshot matrix can be processed in two ways: phonespace and beamspace (404). The decision on whether to process in phonespace or beamspace is based on the Adaptive Target Population Estimator (ATPE) (419). The ATPE takes into account the acoustic environment in which the sonar is being used. If the ATPE suggests that the targets are isolated in direction of arrival and range, the beamspace version of the algorithm can be used to efficiently determine the exact direction cosines of the targets. This case can be illustrated by considering the detection of a swimmer near a buoy. Both of these targets would be compact in direction cosines around some mean and the beamspace method could be applied to angles of arrival near that mean. If the targets are known from the ATPE to be widely distributed in angle at one range, the phonespace schema can be applied. This can be illustrated as in FIG. 5 by considering a swimmer or fish (510) next to the seafloor (511).

ATPE is an improvement over prior art. The number of targets present is a driver in the computation of the covariance matrix eigenvectors and eigenvalues. Reducing this number provides a significant reduction in processing for a given performance and allows for implementation on a less expensive processor.

In the phonespace schema, the snapshot matrix X is pre-multiplied by a rotator matrix which converts (405) the complex sensor data manifold to symmetric data manifold Y (406). Simulations of the snapshot matrix require signals with different phases be used as generated from a random number generator.

Conjugate centro-symmetric matrices $Q_N$ and $Q_M$ (461) can be pre-calculated based only on the number of rows and columns of the sensor array (N, M) (460). These matrices are sparse, unitary, and in the preferred embodiment, calculated from the identity and transposed identity matrices.

Selection matrices $J_1$ and $J_2$ (451) can also be pre-calculated (450) as (N-1)×N matrices which select the first and last N-1 components of an N×1 vector.

K-matrices ($K_1$, $K_2$, $K_3$, $K_4$, $K_{\mu 1}$, $K_{\mu 2}$, $K_{\nu 1}$, $K_{\nu 2}$) (471) can also be pre-computed (470). $K_1$, $K_2$ are real-valued (N-1)×N matrices and are the real and imaginary parts of the product of $J_2$ and $Q_N$. $K_{\mu 1}$, $K_{\mu 2}$ are found by the Kronecker tensor product of an identity matrix and $K_1$ and $K_2$ respectively. $K_3$, $K_4$ are real-valued (M-1)×M matrices and are the real and imaginary parts of the product of $J_2$ and $Q_M$. $K_{\nu 1}$, $K_{\nu 2}$ are found by the Kronecker tensor product of an identity matrix and $K_3$ and $K_4$ respectively.

The rotator matrix is formed by the Kronecker tensor product of the Hermitian transpose of the centro-symmetric matrices $Q_N$ and $Q_M$. The result is a matrix formed by taking all possible products between the elements of the Hermitian transpose of $Q_N$ in the left-right direction and those of the Hermitian transpose of $Q_M$ in the up-down direction. A real data matrix $Y_R$ is formed by stacking the real and imaginary parts of the symmetric data manifold adjacent to one another.

Figure 6:
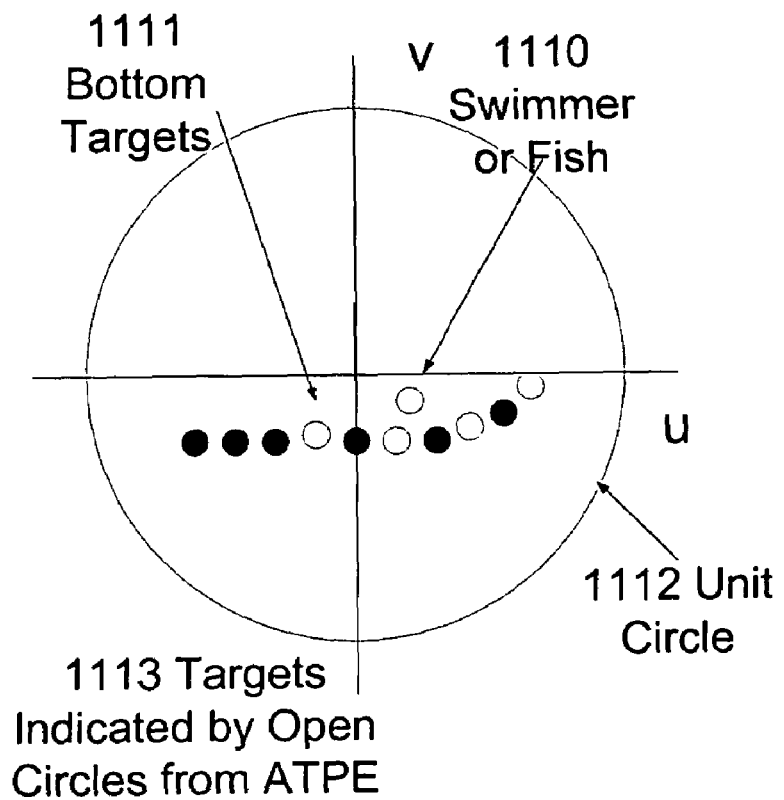
FIG. 6 is an illustration of targets selected using an Adaptive Target Population Estimator.
Figure 7:
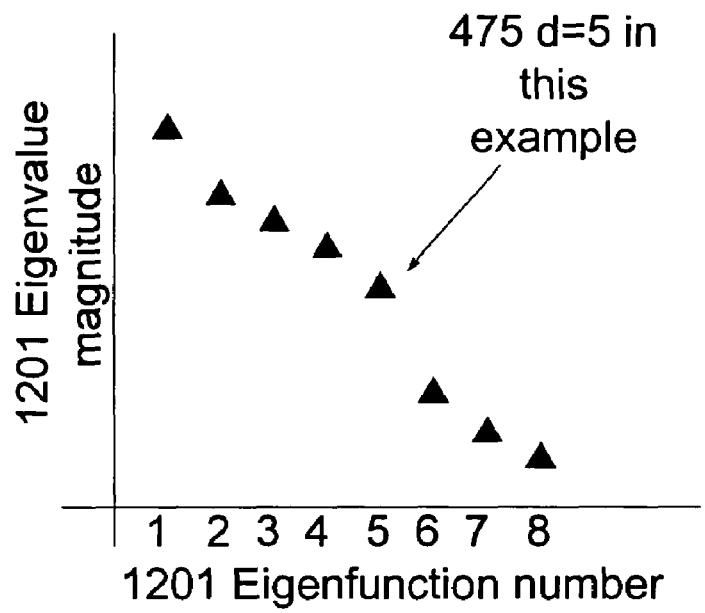
FIG. 7 is an illustration of ranking and winnowing the number of eigenfunctions to use.

Eigenvectors $E_S$ (408) of the real data matrix $Y_R$ (406) are then computed using singular value decomposition. The decomposition produces a diagonal matrix (408) of the same dimension as $Y_R$ and with nonnegative diagonal elements in decreasing order and unitary matrices or "singular vectors". The number of eigenvalues d that are non-zero is related to the number of targets at that particular range. The ATPE (419) provides guidance to the algorithm for choosing d, the number of targets to calculate their direction of arrival. An illustration of the value of ATPE is shown in FIG. 6. 1111 are the arrivals from the seafloor. 1110 is the arrival from an in-water target such as a swimmer or fish. ATPE provides the fewest number of targets d (475) that can provide the location of the in-water target such as swimmer against the bottom represented by the other four white circles (1113). ATPE accomplishes this by "ranking and winnowing" the eigenvalues associated with target eigenvectors (407). The "ranking and winnowing" approach is illustrated in FIG. 7.

The embodiment with the "ranking and winnowing" technique involves estimating the number of actual targets in a snapshot matrix. By calculating the eigenvalues via a singular value decomposition technique, the eigenvalues are ranked by size. This size is related to the signal-to-noise ratio of the individual targets. The ATPE is a routine which looks for changes in the slope of the eigenvalues. A large change indicates the boundary in grouping the eigenvalues in to values created by noise or actual targets. The ATPE also includes a minimum value for eigenvalues. To be selected as a real target and not noise, the eigenvalues must be above some user defined threshold. This threshold may be raised high enough that if the number of real targets were known some of the targets would not be selected. In real-world sonar system implementations it is extremely unlikely that there are many independent, non-continuous targets at a given range. Because of the nature of the ocean environment, many targets will be part of larger continuous targets such as multiple points on the seafloor or multiple points on a sea wall. Within the resolution of the sonar, there are many points on the seafloor which, when used as inputs to correlation techniques used to extract targets from the beamformed data, can be interchanged with one another without affecting the performance of the correlation techniques. One example is illustrated in FIG. 6 where four white circles are shown to be able to approximate the shape the sea floor which was originally composed of the four white circles plus the six black circles. When a non-Fourier based beamformer searches for less targets than are actually present, the detected targets tend to be distributed pseudo-randomly between the actual targets with the tendency to spread across the boundary defined by continuous targets such as the sea floor. Assuming that the range samples are smaller than the range resolution of the sonar system, the boundaries of continuous targets will be detected in general and their boundaries will be well defined after the correlation processing stage extracts target points from the beamformed data. Features on a continuous target that deviate from the trend, such as a rock sticking up from the seafloor, will tend to be of higher signal strength than other parts of the continuous target and the eigenvalues associated with that point will tend to be of greater value. Therefore, when the beamformer finds the actual target locations, the locations of the anomalies will tend not to be smoothed over and missed by the beamformer.

A difference equation (409) is then solved in the vertical which represents the phase relationships between each of the sub-arrays in the sensor array in the vertical direction. Another difference equation (411) is solved in the horizontal which represents the phase relationships between each of the sub-arrays in the sensor array in the horizontal direction.

The solutions to these difference equations (410 and 412) are used to build a complex target matrix (414). The eigenvalues (416) of the complex target matrix are computed (415).

From the real and imaginary parts of the eigenvalues (415), the direction cosines in the x and y directions are computed, respectively, for each target (418). These direction cosines are then fed into the target model for calculations at the next range and eventually provided to the display software (425) described in prior art.

If the beamspace implementation is chosen (404), the snapshot matrix is pre- and post-multiplied by a beam rotator matrices which convert (421) the complex sensor data to symmetric data matrix (422).

Γ-matrices ($\Gamma_1$, $\Gamma_2$, $\Gamma_3$, $\Gamma_4$, $\Gamma_{\mu 1}$, $\Gamma_{\mu 2}$, $\Gamma_{\nu 1}$, $\Gamma_{\nu 2}$) (481) can also be pre-computed (480). $\Gamma_1$, $\Gamma_2$ are real-valued (N-1)×N matrices and are the real and imaginary parts of the product of $J_2$ and $Q_N$. $\Gamma_{\mu 1}$, $\Gamma_{\mu 2}$ are found by the Kronecker tensor product of an identity matrix and $\Gamma_1$ and $\Gamma_2$ respectively. $\Gamma_3$, $\Gamma_4$ are real-valued (M-1)×M matrices and are the real and imaginary parts of the product of $J_2$ and $Q_M$. $\Gamma_{\nu 1}$, $\Gamma_{\nu 2}$ are found by the Kronecker tensor product of an identity matrix and $\Gamma_3$ and $\Gamma_4$ respectively.

Eigenvectors (424) of the symmetric data matrix Y (422) are then computed. A difference equation (427) is then solved in the vertical which represents the phase relationships between each of the sub-arrays in the sensor array in the vertical direction. Another difference equation (425) is solved in the horizontal which represents the phase relationships between each of the sub-arrays in the sensor array in the horizontal direction. The solutions to these difference equations (426 and 428) are used to build a complex target matrix (430). The eigenvalues (432) of the complex target matrix are computed (431). From the real and imaginary parts of the eigenvalues, the direction cosines in the x and y directions are computed, respectively (434). These target direction cosines are provided to the target model (419) which processes for eventual display (435). An important part of the process is the selection of the number of targets to be processed (420). The target model (419) can provide the number of targets in the preferred embodiment.

In preferred embodiment, the complex valued sensor space manifold (which can be thought of as the kernel in a Fourier transform $e^{j2\pi(\mu x + \nu y)}$) is converted to a real valued sensor space manifold by the use of the centro-symmetric matrices $Q_N$ and $Q_M$. In another embodiment with potential for significant computational savings, another real sensor space manifold is based on the two-dimensional Hartley transform. This kernel of the two-dimensional Hartley transform is $$\text{cas}(2\pi(\mu x+\nu y))=\cos(2\pi(\mu x+\nu y))+\sin(2\pi(\mu x+\nu y))$$

This Hartley leads to the relationship between the two-dimensional Fourier transform and the two dimensional Harley transform:. The Hartley transform is a transform method that relies on real numbers. This eliminates the $H(\mu,v)=F_{real}(\mu,v)-F_{imag}(\mu,v)$ requirement to produce a complex target matrix (413) and allows a real target matrix. This reduces the computational burden of this invention. This is implemented as a 2-D Unitary Hartley ESPRIT or as a 2-D Hartley Beamspace ESPRIT.

Figure 8:
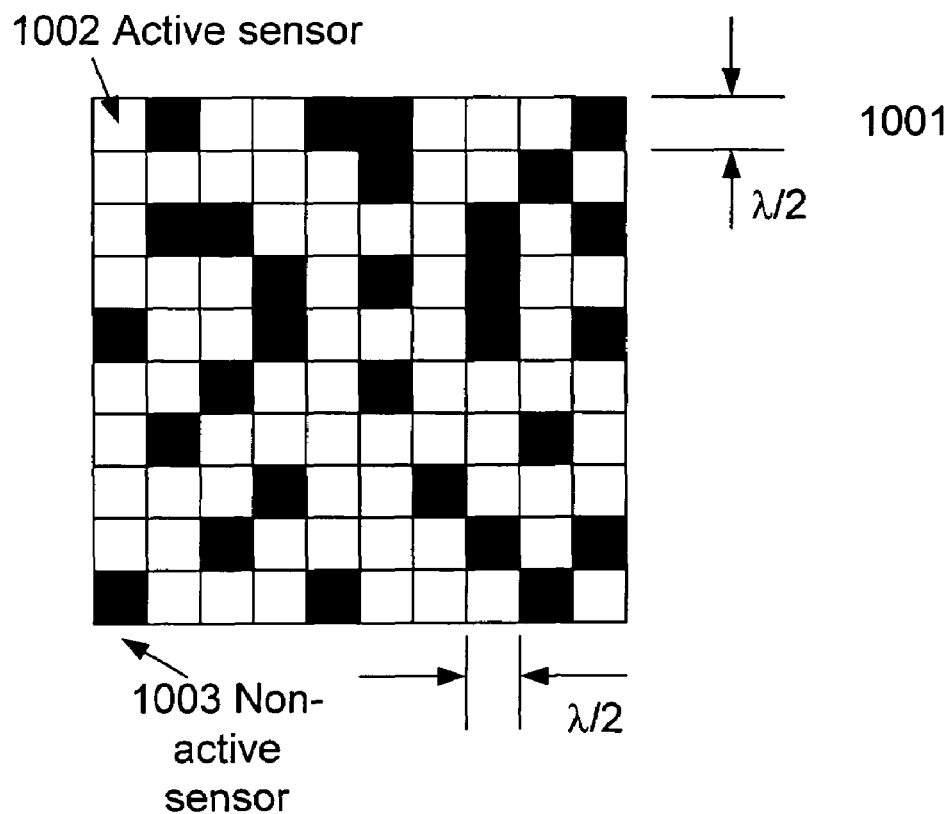
FIG. 8 is an illustration of a sparsely-populated sensor array with half-wavelength spacing.

In the preferred embodiment, the sensor array is M×N with a total of MN sensors. The number of sensors or channels is often directly related to the cost of a system, the fewer the better. On the other hand, system performance is related to the number of sensors, the larger the better. In another embodiment with potential to maintain performance while lowering cost or increase performance for the same cost, some of the channels are turned off to produce a sparse array implementation. A sparse array is illustrated in FIG. 8. This embodiment can be applied to either the phonespace or the beamspace implementations described above. Sidelobes that are the issue with sparse array Fourier beamforming are eliminated in this embodiment. The ATPE (419) could be used to improve the sparse array embodiment.

Figure 9:
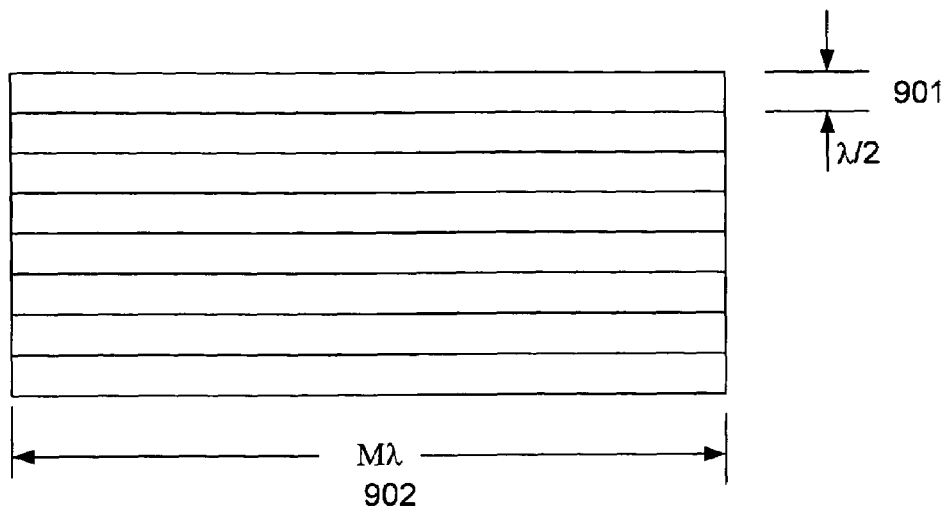
FIG. 9 is an illustration of a one-dimensional array.

In the preferred embodiment, the elements in the sensor array are spaced ½ wavelength apart. In another embodiment, as shown in figure FIG. 9, the size of the elements could be lengthened in one or both dimensions. This embodiment uses a one-dimensional version of the model-based beamformer such as but not limited to ESPRIT applied to an underwater acoustic sidescan sonar application. This embodiment implemented as a sidescan sonar would allow for the determination of depth using the sidescan sonar. The horizontal beamwidth would be approximately 50/M degrees. Traditional sidescan sonars are limited to horizontal range of just a few water depths.

This embodiment with a combination of the bandpass sampling and the model-based beamforming allows for a better water-depth performance for a given number of array elements. Because channel cost is the a significant driver for overall system cost, a reduction in the number of required channels for the same performance is critical for practical sonar system design. This embodiment would allow for an order of magnitude improvement in the range as measured in water depths.

Figure 10:
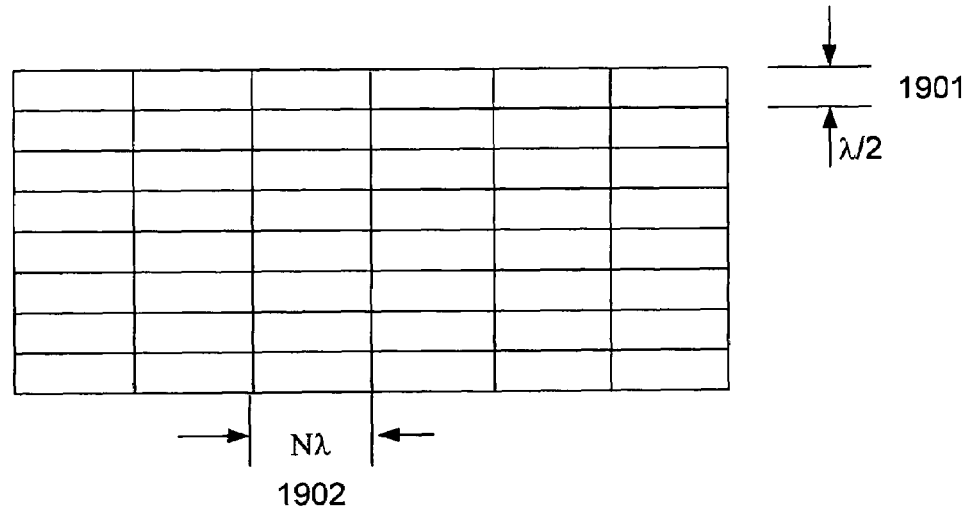
FIG. 10 is an illustration of an array with one-dimension of the sensor array greater than ½ wavelength.
Figure 11:
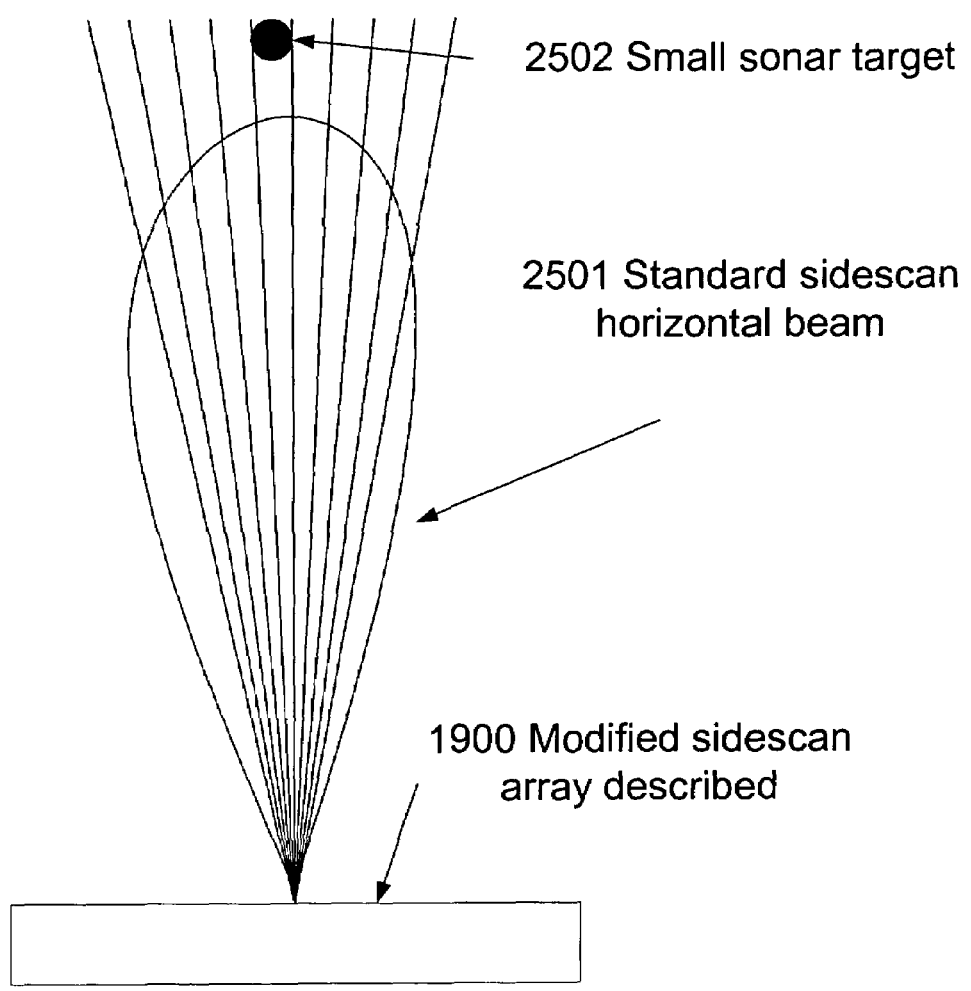
FIG. 11 is an illustration of horizontal beamforming in a sidescan sonar modality.

In yet another embodiment, the size of the elements could be lengthened in one or both dimensions. An illustration of such an array is shown in FIG. 10. This embodiment could use a two-dimensional version of the model-based beamformer such as ESPRIT applied to an underwater acoustic sidescan sonar application. This embodiment implemented as a sidescan sonar would allow for the determination of depth and high angular resolution. This embodiment implemented as a sidescan sonar would allow for the determination of depth and very high resolution in the horizontal using the sidescan sonar modality. This embodiment would allow for an order of magnitude improvement in the horizontal resolution as well range as measured in water depths as illustrated in FIG. 11.

Figure 12:
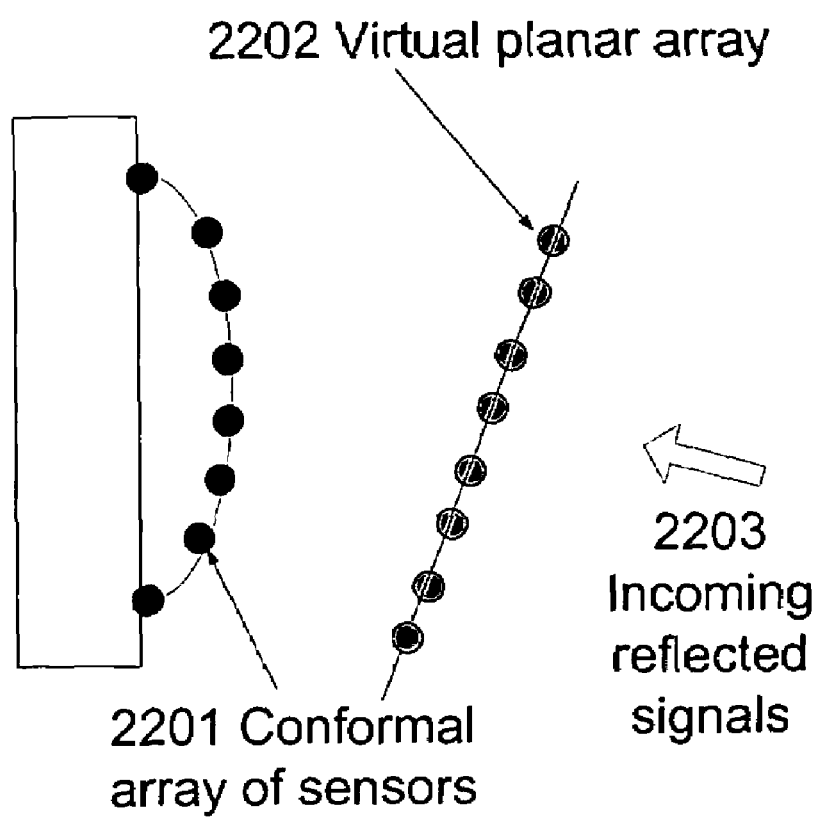
FIG. 12 is an illustration of a virtual array appropriate for processing derived from a conformal array.

In another embodiment, the techniques previously described can be adapted to conformal array. Such an array is illustrated in FIG. 12. A Fourier based beamformer could provide the direction of arrival of one or more target reflected signals (2203). These reflected signals can be converted to an image plane and interpolated onto a regularly spaced grid of virtual sensors in 1 or 2 dimensions. This conversion to an image plane can be accomplished with a phase shift of the appropriate amount. This embodiment is a two step process: 1) phase shift the signals to a plane, and 2) employ the high resolution techniques illustrated in FIG. 2 to the interpolated, gridded and converted signals.

The invention claimed is:

1. A processing technique for an active phased array receiver consisting: a non-Fourier based beamformer where the number of targets to search for is based on the values attained from an Adaptive Target Population Estimator processing technique where the values of the eigenvalues and the slope of successive eigenvalues are used to determine the number of target to be searched for by the beamformer; a correlation based processing techniques to extract valid targets from a beamformed data set.

2. A sonar system comprising:
   a broad beam transmitter;
   a phased array receiver, for electronics including analog signal conditioning electronics and analog to digital converter electronics;
   a processor wherein said processor utilizes a non-Fourier based beamformer and a correlation based processing techniques to extract valid targets from the beamformed data set as in claim 1.

3. A sonar system as in claim 2, wherein the elements in the array are spaced greater than ½ wavelength in at least one dimension.

4. A sonar system as in claim 2, wherein the receiver array is planar.

5. A sonar system as in claim 2, wherein the receiver array is conformal.

6. A sonar system as in claim 2, wherein the duration of a single transmit signal is broken into multiple segments and processed independently each of said duration segments is used as an independent snapshot of the target signal.

7. A sonar system as in claim 2, wherein the receiver electronics utilize bandpass sampling techniques and the processor is configured to operate on bandpass sampled data.

8. A sonar system as in claim 3, wherein the receiver electronics utilize bandpass sampling techniques and the processor is configured to operate on bandpass sampled data.

9. A sonar system as in claim 4, wherein the receiver electronics utilize bandpass sampling techniques and the processor is configure operate on bandpass sampled data.

10. A sonar system as in claim 5, wherein the receiver electronics utilize bandpass sampling techniques and the processor is configured to operate on bandpass sampled data.

11. A sonar system as in claim 6, wherein the receiver electronics utilize bandpass sampling techniques and the processor is configured to operate on bandpass sampled data.

12. A processing technique for an active phased array receiver consisting:
    an Adaptive Target Population Estimator (ATPE) processing technique. a non-Fourier based beamformer, and a correlation based target extraction processing technique:
    wherein said ATPE estimates the number targets at a given range based upon values of the eigenvalues and the change in value of successive eigenvalues when sorted by value:

wherein the number of targets estimated by said ATPE at a given range are used as inputs for the processing of said non-Fourier based beamformer; and wherein said correlation based target extraction processing technique is used to select valid targets from said non-Fourier based beamformer's output.

13. A sonar system comprising:

a broad beam transmitter;

a phased array receiver for receiving electronics including analog signal conditioning electronics and analog to digital converter electronics; and a processor for utilizing a non-Fourier based beamformer and correlation based processing techniques to extract valid targets from a beamformed data set, said processing techniques includes an Adaptive Target Population Estimator processing technique;

wherein values of the eigenvalues and the slope of successive eigenvalues are used to determine the number of targets to be searched for by the beamformer, and a correlation based processing technique for extracting valid targets from the beamformed data set.

* * * * *